(12) United States Patent
Winter et al.

(10) Patent No.: US 8,349,090 B2
(45) Date of Patent: Jan. 8, 2013

(54) PROCESS FOR REMOVING CARBONACEOUS DEPOSITS ON SURFACES OF CATALYSTS AND PLANT PARTS

(75) Inventors: Manfred Winter, Dittelsheim-Hessloch (DE); Hagen Weigl, Ladenburg (DE); Andreas Kramer, Friedelsheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/124,281

(22) PCT Filed: Oct. 9, 2009

(86) PCT No.: PCT/EP2009/063141
§ 371 (c)(1),
(2), (4) Date: Apr. 14, 2011

(87) PCT Pub. No.: WO2010/046244
PCT Pub. Date: Apr. 29, 2010

(65) Prior Publication Data
US 2011/0197929 A1    Aug. 18, 2011

(30) Foreign Application Priority Data
Oct. 20, 2008    (EP) .................................. 08167023

(51) Int. Cl.
*B08B 3/00*    (2006.01)
(52) U.S. Cl. .................. 134/30; 134/2; 134/21; 134/26; 134/36; 134/39; 134/42; 502/38; 502/55
(58) Field of Classification Search ................ 134/2, 21, 134/26, 30, 36, 39, 42; 502/38, 55
See application file for complete search history.

(56) References Cited

U.S. PATENT DOCUMENTS

| | | | |
|---|---|---|---|
| 2,353,508 A * | 7/1944 | Schulze | 208/146 |
| 2,515,245 A * | 7/1950 | Mattox | 518/709 |
| 4,274,942 A | 6/1981 | Bartholic et al. | |
| 4,276,150 A | 6/1981 | McHenry | |
| 4,300,997 A * | 11/1981 | Meguerian et al. | 208/120.1 |
| 4,388,218 A * | 6/1983 | Rowe | 502/43 |
| 4,584,090 A * | 4/1986 | Farnsworth | 208/80 |
| 4,822,761 A * | 4/1989 | Walters et al. | 502/38 |
| 5,110,780 A * | 5/1992 | Peters | 502/303 |
| 5,164,073 A * | 11/1992 | Lam | 208/120.1 |
| 5,254,513 A * | 10/1993 | Sherwood et al. | 502/55 |

FOREIGN PATENT DOCUMENTS

| | | |
|---|---|---|
| EP | 0 071 137 | 2/1983 |
| EP | 0 184 074 | 6/1986 |
| EP | 1 241 154 | 9/2002 |
| WO | 02 45852 | 6/2002 |

OTHER PUBLICATIONS

International Search Report Issued Apr. 16, 2010 in PCT/EP09/063141 filed Oct. 9, 2009.

* cited by examiner

*Primary Examiner* — Bibi Carrillo
(74) *Attorney, Agent, or Firm* — Oblon, Spivak, McClelland, Maier & Neustadt, L.L.P.

(57) ABSTRACT

A process for removing carbonaceous deposits on surfaces of catalysts and plant parts by treating the deposits with a superheated stream of steam admixed at least temporarily with an oxygenous gas is provided, which involves, in each case monitoring the offgas $CO_2$ content after condensation of the steam, at a temperature of at least 300° C.: (a) treating the carbonaceous deposits with superheated steam at a temperature of at least 300° C. until the $CO_2$ content of the offgas has exceeded a maximum; (b) then, with further supply of superheated steam, commencing oxygen supply, the amount of oxygen supplied being adjusted such that the $CO_2$ content in the offgas decreases further until it has fallen to a value of <1% by volume; and then (c) ending the supply of superheated steam and passing an oxygenous gas over remaining amounts of carbonaceous deposits until the deposits have been virtually removed.

20 Claims, No Drawings

PROCESS FOR REMOVING CARBONACEOUS DEPOSITS ON SURFACES OF CATALYSTS AND PLANT PARTS

CROSS REFERENCE TO RELATED APPLICATIONS

The present application is the national stage of international application PCT/EP2009/063141, filed on Oct. 9, 2009, and claims the benefit of the filing date of European Application No. 08167023.4, filed on Oct. 20, 2008.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The invention relates to a process for removing carbonaceous deposits on surfaces of catalysts and plant parts by treating the deposits with a superheated stream of steam admixed at least temporarily with an oxygenous gas.

2. Description of Related Art

EP-A-1 241 154 discloses a process for regenerating a zeolite catalyst, wherein a stream of steam admixed at least temporarily with an oxygenous gas or gas mixture is passed through the reactor. Temperature and oxygen content of the stream of steam are adjusted such that the ignition temperature of the coke deposits is attained, i.e. the catalyst is regenerated with superheated steam which at least temporarily comprises an oxygenous gas.

BRIEF SUMMARY OF THE INVENTION

The regeneration of catalysts with superheated steam and oxygen is known. It is effected, for example, according to the information in U.S. Pat. No. 4,276,150 at temperatures in the range from about 595 to 1220° C., according to EP-A-0 071 137 at from 300 to 450° C., and according to WO-A-02/45852 at from 300 to 800° C.

It is an object of the invention to provide a further process for removing carbonaceous deposits on surfaces of catalysts and plant parts.

The object is achieved in accordance with the invention by a process for removing carbonaceous deposits on surfaces of catalysts and plant parts by treating the deposits with a superheated stream of steam admixed at least temporarily with an oxygenous gas, which comprises, in each case with monitoring of the $CO_2$ content in the offgas after condensation of the steam, at a temperature of at least 300° C., (a) treating the carbonaceous deposits with superheated steam at a temperature of at least 300° C. until the $CO_2$ content of the offgas has exceeded a maximum, (b) then, with further supply of superheated steam, commencing the supply of oxygen, the amount of oxygen supplied being adjusted such that the $CO_2$ content in the offgas decreases further until it has fallen to a value of <1% by volume, and then (c) ending the supply of superheated steam and passing an oxygenous gas over the amounts of carbonaceous deposits still remaining until the deposits have been virtually removed.

With the aid of this process, it is possible, within a plant, to gently regenerate a catalyst covered with carbonaceous deposits and to gently clean plant parts such as reactors or columns which comprise carbonaceous deposits. During the removal of the carbonaceous deposits, virtually no temperature peaks occur, and so there is no risk of a metal fire within the plant either. The catalyst covered with deposits can be regenerated directly in the reactor. This dispenses with the deinstallation of the contaminated catalyst or of contaminated random packings in a column. This prevents mechanical destruction of catalysts or random packings.

BRIEF DESCRIPTION OF THE SEVERAL VIEWS OF THE DRAWING

Not Applicable

DETAILED DESCRIPTION OF THE INVENTION

In the course of catalytic conversion of organic compounds, usually carbonaceous deposits form on the catalyst and in parts of the plant. This phenomenon is observed especially in the preparation of monomers. The deposits reduce the activity of the catalyst because they reduce the active surface area of the catalyst. In the extreme case, they lead to such a high pressure drop in the production plant that the plant has to be shut down. EP-A-0 184 074 discloses such a process for preparing N-vinylformamide by pyrolyzing formylalaninenitrile in the presence of solids as a catalyst under reduced pressure at temperatures of from 250 to 650° C. Useful catalysts are preferably aluminum oxides, which are activated, for example, with potassium ions. In this process, carbonaceous deposits form both on the catalyst and in parts of the reactor. They may be coke deposits or insoluble polymers. For example, there may be undesired polymerization of N-vinylformamide within the column. The polymers which form therein are insoluble in virtually all solvents. However, the deposits described can be removed gently with the aid of the process according to the invention.

Carbonaceous deposits on catalysts, especially those carbonaceous deposits which arise in the preparation of N-vinylformamide by the process of EP-A-0 184 074, are removed by the process according to the invention from the surfaces of catalysts and from the inner walls of plant parts at temperatures in the range from 300 to 600° C., preferably from 400 to 600° C., and especially from 450 to 550° C. The regeneration of the catalysts can be undertaken in a separate reactor after deinstallation from the plant, but is preferably effected within the production plant. For the removal of the carbonaceous deposits, the reactor intended for the regeneration of the catalyst or the reactor of the production plant can be heated to the required temperature electrically or with the aid of a salt bath. However, it is also possible to heat the reactors or the interior parts of plants covered with carbonaceous deposits with the aid of superheated steam.

In process step (a), for example, superheated steam which has a temperature in the range from, for example, 300 to 600° C. is passed into the reactor which comprises the catalysts provided with carbonaceous deposits and usually itself also has carbonaceous deposits on the inner walls. In the preferred embodiment of the process according to the invention, nitrogen and/or another inert gas is in each case additionally passed into the reactor in process steps (a), (b) and (c). The gases formed in the endothermic reaction of steam with the carbonaceous deposits, such as hydrogen, carbon monoxide and carbon dioxide, are diluted by the introduction of nitrogen and discharged from the reactor. The nitrogen serves effectively as an entraining gas. Based on the internal superficial surface area of the apparatus part or of the reactor which comprises the catalyst to be treated, for example, from 0 to 90 m$^3$ (STP)/m$^2$·h, preferably from 1 to 75 m$^3$ (STP)/m$^2$·h and especially from 25 to 35 m$^3$ (STP)/m$^2$·h of nitrogen or another inert gas is used.

The amount of steam employed may likewise vary within a wide range. For example, based on the internal superficial surface area of the apparatus part or of the reactor, from 30 to 550 kg/m$^2$·h, preferably from 45 to 450 kg/m$^2$·h, is used.

After leaving the reactor in which the regeneration of the catalyst is undertaken, the offgas is quenched, such that it escapes, for example, at a temperature of 40° C. The steam supplied is condensed. The offgas is analyzed continually during the regeneration of the catalyst. It comprises hydrogen, carbon monoxide and carbon dioxide. The process of the removal of carbonaceous deposits is monitored with reference to the $CO_2$ concentration in the offgas. It is at first 0% and rises, after the onset of the reaction, initially to a value of, for example, up to 30% by volume, usually 25% by volume. If nitrogen or another inert gas is used as an entraining gas in addition to the superheated steam, this measure should of course be taken into account in the analysis of the offgas. In order to be able to make a valid statement about the $CO_2$ content in the offgas after the condensation of the steam, preference is given to keeping the amount of nitrogen or of another inert gas supplied in each case constant. For example, in the case of a change in the amount of nitrogen supplied in process step (a), the amount of $CO_2$ in the offgas after the condensation of the steam should be corrected according to the amount of nitrogen supplied, in order to have control over the course of the reaction.

When the $CO_2$ content of the offgas has exceeded a maximum, in process step (b), with further supply of superheated steam, the supply of oxygen is commenced, the amount of oxygen supplied being adjusted such that the $CO_2$ content in the offgas decreases further until it has fallen to a value of <1% by volume. In process step (b), preference is given to lowering the $CO_2$ content in the offgas after the condensation of the steam down to a value of <0.5% by volume. In process step (b), steam and an oxygenous gas are used simultaneously. The oxygenous gas is either air or consists preferably of a mixture of nitrogen and oxygen. The oxygen concentration of this gas mixture is, for example, from 0.01 to 30% by volume, preferably from 5 to 22% by volume. It is regulated such that the $CO_2$ content of the offgas decreases further after the condensation of the steam. This prevents temperature peaks in the regeneration of the catalyst and in the removal of deposits from plant parts.

In process step (b)—as soon as the maximum of the $CO_2$ content in the offgas after the condensation of steam has been exceeded—the supply of oxygen is commenced. For example, the oxygen supply is commenced when the $CO_2$ content in the offgas after the condensation of the steam has fallen to a value of less than 95%, preferably less than 90%, of the maximum value. Usually, the oxygen is supplied when the $CO_2$ content of the offgas is in the range from 85 to 95% of the maximum value.

In process step (c), the supply of superheated steam is ended and air or an oxygenous gas mixture is passed over the amounts of carbonaceous deposits still remaining until the deposits have been virtually removed. In the course of this, the volume ratio of superheated steam to oxygenous gas is varied stepwise or continuously in such a way that the proportion of steam is reduced to 0% by volume while increasing the proportion of oxygenous gas or air. The oxygen content of the gas stream composed of supplied steam, oxygen and nitrogen is, for example, from 0.01 to 35% by volume, preferably from 1 to 22% by volume. After the addition of steam in process step (c) has ended, the remaining carbonaceous deposits still present are treated with a gas mixture of nitrogen and oxygen, preferably air, until the deposits have been virtually removed.

In this process regime, the temperature in the reactor remains virtually constant during the removal of carbonaceous deposits or varies only slightly. Temperature peaks are avoided. The risk of ignition of hydrogen and carbon monoxide is avoided in the process according to the invention.

With the aid of the process according to the invention, it is possible to gently remove both carbonaceous deposits on surfaces of catalysts and carbonaceous deposits on surfaces of plant parts. The type of carbonaceous deposits is not crucial. It is possible in accordance with the invention to regenerate catalysts which are used, for example, in a synthesis of monomers, or else those catalysts which are used in the dehydrogenation of $C_2$ to $C_{30}$ hydrocarbons.

EXAMPLE

In the preparation of N-vinylformamide by the process of EP-A-0 184 074, carbonaceous deposits were formed on the catalyst and on the inner walls of the reactor, which reduced the conversion and led to a pressure drop in the plant. The catalyst consisted of aluminum oxide which had been activated with potassium ions. In order to remove the carbonaceous deposits on the catalyst and in the reactor, the reactor was heated to a temperature of 530° C. with the aid of a salt bath. 200 l/h of nitrogen and 1 kg/h of superheated steam at a temperature of in each case 530° C. were passed through the reactor from the top. The gas stream which exited at the lower end of the reactor was quenched with water in a column, which condensed the excess steam supplied to the reactor and passed it into the wastewater. The offgas escaped at the top of the column. It had a temperature of 40° C. and was analyzed continually for the $CO_2$ content. The $CO_2$ content of the offgas rose up to a value of 22% by volume and then declined. Once the content of $CO_2$ had fallen down to 90% of the maximum $CO_2$ content, 200 l/h of air were first additionally conducted into the reactor and the amount of air was increased stepwise to 750 l/h, in the course of which the amount of air was regulated such that the $CO_2$ content in the offgas after the condensation of the steam decreased continuously. Once the $CO_2$ content in the offgas after the condensation of the steam had fallen to a value of 0.45% by volume, the amount of steam supplied was reduced stepwise and the steam supply was finally ended. The proportion of the air which was supplied to the reactor was increased to 1300 l/h. After a total run time of 15 hours, the $CO_2$ content in the offgas was 0.05% by volume. After this time, catalyst and reactor had been virtually completely freed of carbonaceous deposits.

The invention claimed is:

1. A process for removing a carbonaceous deposit on a surface of at least one of a catalyst and a plant part, the process comprising the steps of:
   (a) treating the carbonaceous deposit with superheated steam, without a supply of oxygen, at a temperature of at least 300° C. to generate a reaction comprising an offgas, wherein the treating step is performed until a $CO_2$ content in the offgas has exceeded a maximum value;

(b) then, with further supply of superheated steam, commencing a supply of an oxygen-comprising gas, wherein an amount of oxygen supplied is adjusted such that the $CO_2$ content in the offgas decreases further until it has fallen to a value of <1% by volume; and then (c) reducing until ending the supply of superheated steam, while passing the oxygen-comprising gas over amounts of the carbonaceous deposit still remaining until the carbonaceous deposit has been virtually removed, wherein the maximum value of the $CO_2$ content in the offgas is based on gasifying the carbonaceous deposit.

2. The process of claim 1, wherein the carbonaceous deposit is removed at a temperature in a range from 400 to 600° C. from the surface of the catalyst, the plant part, or the catalyst and the plant part.

3. The process of claim 1, wherein nitrogen is additionally supplied in each of (a), (b), and (c).

4. The process of claim 1, wherein the $CO_2$ content in the offgas is lowered in (b) down to a value of <0.5% by volume.

5. The process of claim 1, wherein the supply of the oxygen-comprising gas is commenced in (b) when the $CO_2$ content in the offgas has fallen to a value of less than 95% of the maximum value in (a).

6. The process of claim 1, wherein a volume ratio of the superheated steam to the oxygen-comprising gas in (c) is varied stepwise or continuously in such a way that a proportion of the superheated steam is reduced to 0% by volume while increasing a proportion of the oxygen-comprising gas.

7. The process of claim 1, wherein the carbonaceous deposit is removed from the surface of the catalyst.

8. The process of claim 1, wherein the carbonaceous deposit is removed from the surface of the plant part.

9. The process of claim 2, wherein nitrogen is additionally supplied in each of (a), (b), and (c).

10. The process of claim 2, wherein the $CO_2$ content in the offgas is lowered in (b) down to a value of <0.5% by volume.

11. The process of claim 2, wherein the supply of the oxygen-comprising gas is commenced in (b) when the $CO_2$ content in the offgas, has fallen to a value of less than 95% of the maximum value in (a).

12. The process of claim 2, wherein a volume ratio of the superheated steam to the oxygen-comprising gas in (c) is varied stepwise or continuously in such a way that a proportion of the superheated steam is reduced to 0% by volume while increasing a proportion of the oxygen-comprising gas.

13. The process of claim 3, wherein the $CO_2$ content in the offgas is lowered in (b) down to a value of <0.5% by volume.

14. The process of claim 3, wherein the supply of the oxygen-comprising gas is commenced in (b) when the $CO_2$ content in the offgas has fallen to a value of less than 95% of the maximum value in (a).

15. The process of claim 3, wherein a volume ratio of the superheated steam to the oxygen-comprising gas in (c) is varied stepwise or continuously in such a way that a proportion of the superheated steam is reduced to 0% by volume while increasing a proportion of the oxygen-comprising gas.

16. The process of claim 4, wherein the supply of the oxygen-comprising gas is commenced in (b) when the $CO_2$ content in the offgas has fallen to a value of less than 95% of the maximum value in (a).

17. The process of claim 4, wherein a volume ratio of the superheated steam to the oxygen-comprising gas in (c) is varied stepwise or continuously in such a way that a proportion of the superheated steam is reduced to 0% by volume while increasing a proportion of the oxygen-comprising gas.

18. The process of claim 5, wherein a volume ratio of the superheated steam to the oxygen-comprising gas in (c) is varied stepwise or continuously in such a way that a proportion of the superheated steam is reduced to 0% by volume while increasing a proportion of the oxygen-comprising gas.

19. The process of claim 6, wherein a volume ratio of the superheated steam to the oxygen-comprising gas in (c) is varied continuously.

20. The process of claim 9, wherein the $CO_2$ content in the offgas is lowered in (b) down to a value of <0.5% by volume.

* * * * *